United States Patent Office 3,195,537
Patented July 20, 1965

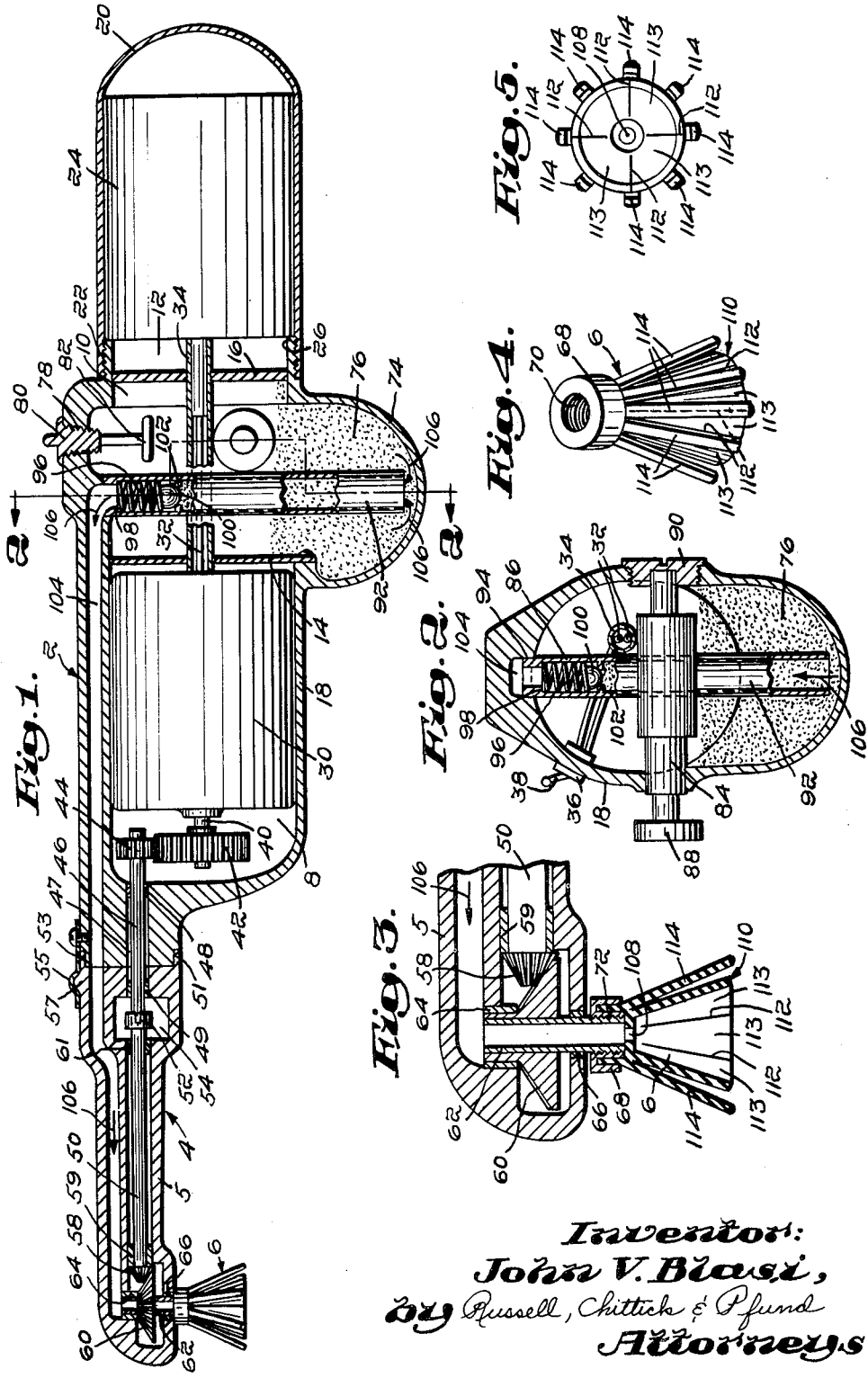

3,195,537
POWER DRIVEN TOOTH CLEANER AND GUM STIMULATOR
John V. Blasi, 525 Hammond St., Newton, Mass.
Filed Sept. 25, 1962, Ser. No. 226,002
4 Claims. (Cl. 128—56)

This invention relates to dental appliances and more particularly to a power driven tooth cleaner and gum stimulator of the rotary motor driven type.

An object of this invention is to provide an improved motor driven dental cleaner capable of thoroughly cleansing and polishing the teeth while simultaneously stimulating the gums.

Another object of this invention is to provide an integrally molded rotary cleansing and stimulating element of resilient material capable of thoroughly cleaning the teeth without irritating the mouth or gums.

Another object of this invention is to provide a new and improved dental cleaner structure capable of being conveniently held in one hand and having means contained therein for dispensing dentifrice directly on the tooth surface during the cleansing operation.

A further object of this invention is to provide a dental cleaner with a handle portion containing a self-powered driving mechanism completely detachable from an outwardly extending arm member, thereby permitting the hygienic use of a plurality of arms in conjunction with a single handle portion.

These and other objects and advantages of the invention will become more apparent as the description proceeds with the aid of the accompanying drawings in which:

FIG. 1 is an enlarged sectional view in side elevation of a power driven tooth cleaner and gum stimulator according to the invention.

FIG. 2 is a sectional view of the handle portion taken through the dentifrice reservoir along line 2—2 of FIG. 1 and showing the spring-loaded ball valve assembly.

FIG. 3 is a further enlarged sectional view in side elevation of the arm extremity showing a detail of the cleansing and stimulating element.

FIG. 4 is a view in perspective of the rotary cleansing and stimulating element.

FIG. 5 is a bottom view of the rotary cleansing and stimulating element.

Referring now to the drawings, FIG. 1 is an illustration of the rotary cleansing and stimulating device wherein 2 generally indicates the handle portion and 4 generally designates the outwardly extending arm member comprising the combination of a neck portion 5 and a removably attached rotary cleansing and stimulating element 6. The handle portion is divided into compartments 8, 10 and 12 by partitions 14 and 16. Compartment 12 is completely enclosed by partition 16 and cover 20 which is removably attached to the end of handle wall 18 by means of screw-threads 22 on the exterior of collar 26. Battery 24 is contained within compartment 12 and is held securely in place between the end of collar 26 and cover 20.

Motor 30 is secured within compartment 8 and is energized by battery 24 through wire leads 32 contained within a sealed conduit 34 passing from compartment 12 through compartment 10 to compartment 8. The operation of motor 30 is controlled by a switch 36 (shown in FIG. 2) having a lever 38 extending through handle wall 18.

Drive shaft 40 is connected to motor 30 and carries a large driving gear 42. Meshing with driving gear 42 is a smaller driven gear 44 which is mounted on the end of shaft 46 contained within bore 47 and suitably journaled in bearing 48 in handle portion 2 and bearing 49 in the outwardly extending neck portion 5. Neck portion 5 has lip 51 adapted to fit over handle portion 2 as at 53 and is held firmly in place by spring clip 55 mounted on handle wall 18. Spring clip 55 snaps over protuberance 57 on the neck portion and allows the two pieces to be quickly disconnected by simply pulling them apart. Shaft 50 suitably journaled in bearings 59 and 61 is connected at one end to shaft 46 by coupling 52 contained within an enlarged space 54 in neck portion 5; the other end of shaft 50 comprises a bevel gear 58 which meshes with pinion 60. Pinion 60 is attached to hollow shaft 62 which is journaled in bearings 64 and 66.

As can be better seen in FIGS. 3 and 4, the rotary cleansing and stimulating element 6 is provided with collar 68 containing a circular threaded aperture 70 which permits it to be screwed to external threads 72 on hollow shaft 62. Because the handle portion 2 and the outwardly extending arm member 4 can be easily separated and reassembled, it is possible to utilize one handle portion in conjunction with several arm members, thereby enabling several persons to hygienically utilize one handle portion by simply providing an individual arm member for each user. When employed for professional use, a supply of sterilized arm members can be kept on hand for use on individual patients.

Compartment 10 is tightly enclosed between partitions 14 and 16 and is provided with a bulbous base 74. A supply of dentifrice 76 is injected into compartment 10 through aperture 78 after removal of screw plug 80. Loss of screw plug 80 is prevented by a resilient depending member 82 attached to the plug and having a circular flat extremity with a diameter greater than that of aperture 80.

As can be seen in FIG. 2, compartment 10 contains an air pump 84 and a spring-loaded ball valve assembly 86. The air pump is provided with a removable handle 88 protruding from handle wall 18. Replacement of the pump is made possible by first removing handle 88 and screw plug 90 and then laterally withdrawing the pump assembly. A new pump assembly can then be inserted and the handle 88 and screw plug 90 replaced.

A vertical tube 92 shown in partial section in FIGS. 1 and 2 and comprising the ball valve casing is force fitted within handle portion 2 as at 94. A spring 96 is held in compression between collar 98 and ball 100 which in turn rests on collar 102. As the handle 88 of air pump 84 is operated, air pressure is increased within compartment 10. This pressure exerts a force on the supply of dentifrice 76 stored within the cavity created by the bulbous base of the compartment and forces a portion of the dentifrice up vertical tube 92. As the pressure increases and overcomes the opposing force exerted by spring 96 on ball 100, the ball is raised above collar 102 and dentifrice is pushed past spring 96 and into a tubular passageway 104 provided in the upper part of handle portion 2. The direction of dentifrice flow is indicated by arrows 106 in FIGS 1–3. As the operation of air pump 84 is continued, dentifrice is eventually deposited within the cleaning and stimulating element 6 after passing through an extension of tubular passageway 104 in neck portion 5, hollow shaft 62 and aperture 103.

As can be seen in FIGS. 3 and 5, the rotatable cleansing and polishing element 6 is comprised of a conically shaped unit 110 of plastic, rubber or other suitably resilient material containing a plurality of slits 112 parallel to the longitudinal axis of the element to form bendable sections 113. It should be understood that unit 110 may also be manufactured without slits 112 in order to provide a more rigid unitized wall structure. Under these circumstances, the unit is usually provided with a series of inwardly disposed ribs which tend to increase the polishing action. A plurality of stimulating fingers comprising longitudinal resilient members 114 are molded to the upper portion of conically shaped unit 110 and extend outwardly from beneath collar 68. It should also be noted that fingers 114 may be comprised of bristles. Fingers 114 must be long enough to reach and engage the gums when unit 110 is applied to the teeth.

The operation of the invention will now be described. It should be noted at the outset that handle portion 2 is of such size and configuration that it may be conveniently grasped in a person's hand. Motor 30 is energized by operating switch 36. This causes gears 42 and 44 and their respective shafts to rotate, thereby resulting in the rotation of cleansing and stimulating element 6. The outwardly extending arm member 4 is then introduced into the mouth and the cleansing and stimulating element 6 position in closed proximity to the tooth surface. A suitable quality of dentifrice is then deposited within the rotating conical surface 110 of the cleansing and stimulating element 6 by operating handle 88 of air pump 84. The rotating cleansing and stimulating element 6 is then pressed against the tooth surface. Since the conical unit 110 contains a plurality of longitudinal slits 112, its sections 113 are spread as pressure is applied, causing the deposited dentifrice to be applied and rubbed against the tooth surfaces. In addition, as element 6 rotates, longitudinal fingers 114 are moved outward from the center of rotation by centrifugal force and the outward bending of sections 113 to come into contact with the gums resulting in a gentle stimulating action.

Because of the convenient size and configuration of arm member 5, the cleansing and stimulating member 6 can be easily maneuvered within the mouth and applied to all tooth surfaces. As more dentifrice is required, air pump 84 is operated by operating handle 88. In addition, since the cleansing and stimulating element 6 is screwed to hollow shaft 62, it may be quickly and easily removed when worn.

It is my intention to cover all changes and modifications of the example of the invention herein chosen for purposes of disclosure which do not constitute departures from the spirit and scope of the invention.

I claim:

1. A motor driven dental appliance comprising a hollow handle portion, an arm member extending outwardly from said handle portion, said arm member comprising a neck portion and a rotatable cleansing and stimulating element extending transversally thereto, said handle portion divided into three compartments, one compartment having attached thereof a removably mounted end cover and containing an electrical storage cell, a second compartment comprising a reservoir for the storage of dentifrice and containing means therein for pumping said dentifrice, the third compartment containing means for driving said rotatable cleansing and stimulating element and a tubular passageway having one end connected to said reservoir, an intermediate tubular passageway contained within said neck portion and in communication with the other end of said first mentioned tubular passageway, said arm member removably attached to said handle portion adjacent to said third compartment, said driving means comprising an electrical motor connected to and powered by said electrical storage cell, said motor operatively coupled to a drive shaft contained within said arm member, said drive shaft operatively connected to a hollow drive shaft, said hollow drive shaft including an axial passageway providing a further continuation of said intermediate tubular passageway, said rotatable cleansing and gum stimulating element attached to said hollow drive shaft and provided with an aperture communicating with said axial passageway through which said dentifrice pumped from said reservoir may pass and be deposited directly on the tooth surface during the cleaning operation.

2. A motor driven dental appliance comprising a handle portion having a removable arm member extending outwardly therefrom, a hollow rotary element rotatably attached to the distal end of said removable arm member, said rotary element provided with an integral tooth engaging portion for cleansing tooth surfaces and a plurality of flexible radially disposed stimulating fingers arranged to gently stroke the gums during application of said tooth engaging portion to the teeth, a supply of dentifrice contained within said handle portion, pump means for pumping said dentifrice from said handle portion through said arm member to the interior of said rotary element, and powered drive means for rotatably driving said rotary element, said pump means and drive means contained within said handle portion.

3. A dental appliance comprising a hollow handle portion with a replaceable arm member extending outwardly therefrom, said arm member adapted for quick engagement and disengagement from said handle portion and comprising a neck portion with a rotatable cleaning and gum stimulating element removably attached to the distal end thereof, said rotatable cleaning and gum stimulating element being integrally molded of resilient material and comprising a conically shaped unit with an axial aperture leading to the interior thereof, the upper extremity of said unit terminating in a collar, a plurality of longitudinal stimulating finger elements attached to said unit and extending outwardly from beneath said collar, said unit containing a plurality of slits parallel to the longitudinal axis of said element to provide bendable sections, means for rotating said cleaning and gum stimulating element, said means comprising an electric motor and battery contained within said handle portion and operatively connected through said neck portion to said cleaning and gum stimulating element, a supply of dentifrice contained within said handle portion, and means for pumping said dentifrice from said handle portion through said neck portion and said cleaning and gum stimulating element to a point directly on the tooth surface during the cleaning and gum stimulating operation.

4. A dental appliance comprising: a hollow handle portion having a replaceable arm member extending outwardly therefrom, said arm member adapted for quick engagement and disengagement from said handle portion; a neck portion on said handle portion having a tubular passageway extending therethrough and a rotatable cleaning and gum stimulating element removably attached to the distal end thereof, said rotatable cleaning and gum stimulating element comprising a resilient conically shaped unit with an axial aperture leading from said tubular passageway to the interior thereof, the upper extremity of said unit terminating in a collar, a plurality of gum stimulating members extending outwardly from beneath said collar, said conically shaped unit containing a plurality of slits parallel to the longitudinal axis of said element to provide bendable sections; means for rotating said cleaning and gum stimulating element comprising an electric motor and battery contained within said handle portion and operatively connected through said neck portion to said cleaning and gum stimulating element; a source of dentifrice stored within said handle portion; and means for pumping said dentifrice from said handle portion through said neck portion and said rotary cleaning and gum stimulating element directly on the tooth surface during the cleaning operation, said means comprising an air pump secured within said reservoir and located transversely to the longitudinal axis of said handle, an exterior operating handle connected to said pump and adapted for reciprocating movement, said pump connected to said tubular passageway and operated by said exterior handle, and tube means connecting said reservoir to said pump, said tube means containing a one-way valve.

References Cited by the Examiner

UNITED STATES PATENTS

| | | | |
|---|---|---|---|
| 2,226,145 | 12/40 | Smith | 15—29 |
| 2,738,528 | 3/56 | Fridge | 15—29 X |
| 2,808,602 | 10/57 | Gregoire | 15—28 |
| 2,841,806 | 7/58 | Blasi | 15—24 |
| 3,033,197 | 5/62 | Barckley | 128—62 |
| 3,056,151 | 10/62 | Vlacancich | 15—29 |

RICHARD A. GAUDET, *Primary Examiner.*

RICHARD J. HOFFMAN, *Examiner.*